United States Patent [19]

Atkinson

[11] 4,148,402

[45] Apr. 10, 1979

[54] DEVICE FOR LOADING CYLINDRICAL ARTICLES

[75] Inventor: Michael L. Atkinson, Broomfield, Colo.

[73] Assignee: Ball Corporation, Muncie, Ind.

[21] Appl. No.: 788,188

[22] Filed: Apr. 18, 1977

[51] Int. Cl.² .................. B23Q 5/24; B23B 15/00
[52] U.S. Cl. .................................. 414/676; 82/48; 82/101; 82/102; 113/115
[58] Field of Search ............ 82/47, 48, 101, 102, 82/54, 60; 113/7 R, 7 A, 115; 214/1 B, 1 BE, DIG. 3

[56] References Cited

U.S. PATENT DOCUMENTS

| 3,400,620 | 9/1968 | Armbruster et al. ............ 82/47 |
| 3,481,233 | 12/1969 | Yann et al. .................... 82/101 |
| 3,756,103 | 9/1973 | Cvacho et al. ................. 82/47 X |
| 4,014,228 | 3/1977 | Dean ............................. 82/47 |

Primary Examiner—Leonidas Vlachos

Attorney, Agent, or Firm—O'Rourke & Harris

[57] ABSTRACT

Method and device for loading cylindrical articles in a processing apparatus including a rotatable starwheel with pockets defined therein which carry the cylindrical articles and a plurality of mandrels aligned with the pockets for rotation with the starwheel such that the cylindrical articles may be axially transferred from the pocket onto the mandrel for processing, the device primarily comprising a plurality of conduit outlets which may be intermittantly connected through valve means to a compressed gas source to produce a jet of compressed gas at predetermined positions in the rotation of the starwheel pocket and onto the mandrel, and more preferably further including a vacuum passage through the mandrels which may be selectively connected to a vacuum source to work in synchronous with the compressed gas jet to provide both an internal vacuum and an external gas jet urging the cylindrical article onto the mandrel.

6 Claims, 4 Drawing Figures

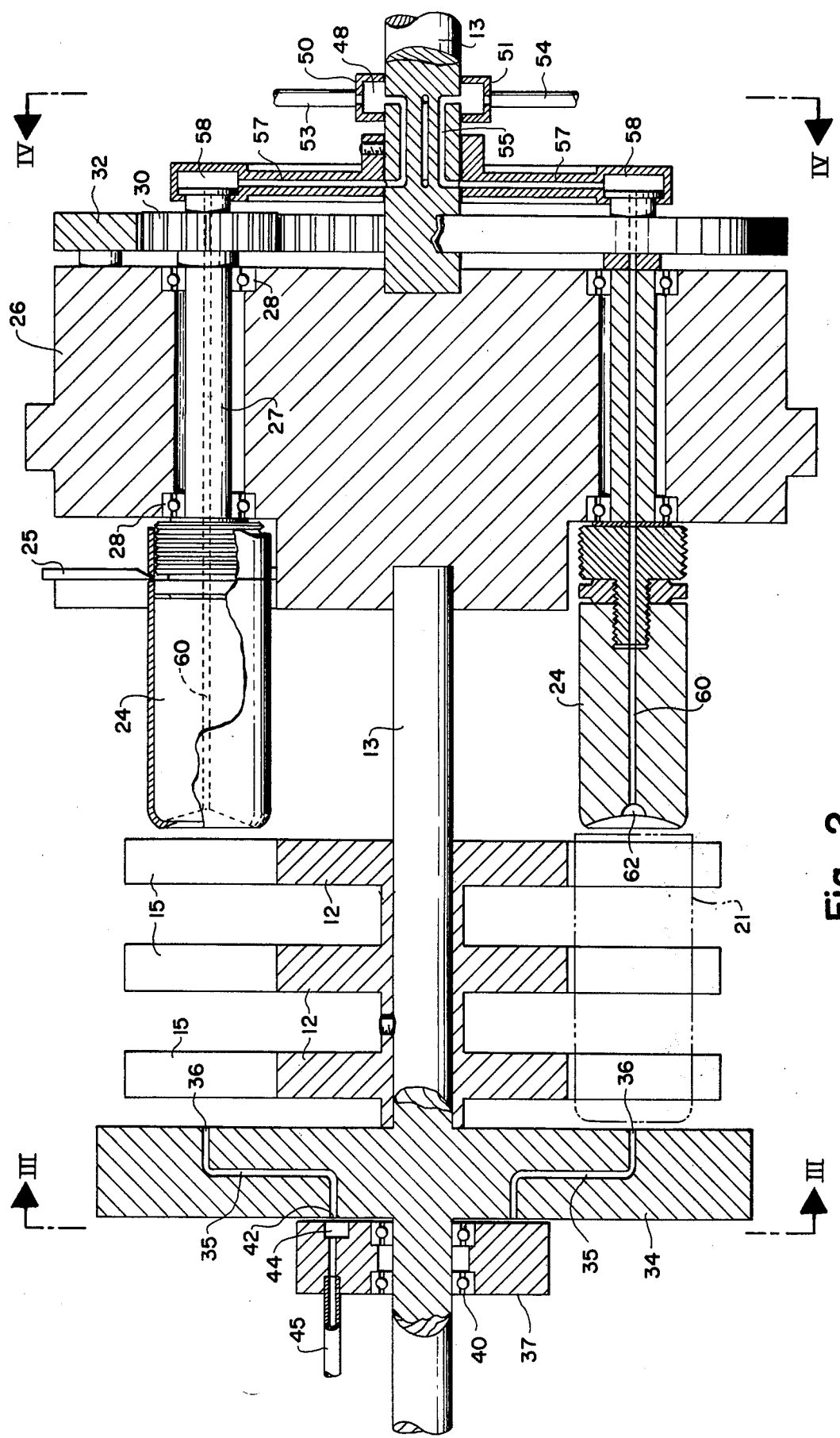

DEVICE FOR LOADING CYLINDRICAL ARTICLES

BACKGROUND OF THE INVENTION

1. Field of the Invention

The present invention relates generally to methods and devices for loading cans in synchronous, high speed operations from starwheels onto corresponding aligned mandrels for processing of the cylindrical article, and more particularly pertains to a method and device involving selectively activated gas jets to axially urge a cylindrical article from a starwheel pocket onto a mandrel and, preferably, further includes a vacuum source connectable at preselected positions to a passage through the mandrel to cooperate with the gas jet in feeding the cylindrical article onto the mandrel for processing.

2. Description of the Prior Art

There exists a substantial background of art dealing with processing of cylindrical articles, and particularly of cans closed at one end and open at the other end, by means of mounting the can on a mandrel and performing the desired process. Among the processes commonly practiced are trimming a cam to a desired length, paneling of the can, flanging of the can, beading the edge of a can and other such well-known operations.

In order to facilitate high speed processing which often is carried out at rates of 600 to 800 cans per minute, a more or less conventional approach has been derived. Generally, the can is first placed in a rotatable starwheel pocket, either through conventional tangential feed, or through axial feed as disclosed in, for instance, copending U.S. Patent application Ser. No. 612,159, now U.S. Pat. No. 4,014,228. The starwheel may move in an indexed fashion, i.e., through such a Geneva drive mechanism which, in essence, intermittantly starts and stops the starwheel. The indexing drive facilitates feeding and movement of the can axially onto a mandrel for processing. However, preferably the starwheel is driven in a continuous fashion to facilitate high speed operation. A plurality of mandrels are synchronously driven adjacent to but axially spaced from the starwheel with a mandrel aligned with each pocket of the starwheel. Thus, whether driven in an indexing fashion or continuously, the pocket and mandrel are maintained in axial alignment.

The instant invention pertains most particularly to the axial movement of the cylindrical article from the starwheel pocket onto the mandrel. While this is a simple motion per se, high speed operation of the apparatus and attendant timing requirements and kinetic energies are troublesome, particularly with regard to jamming. If for some reason the mechanism or a can becomes jammed, the rapidly rotating starwheel and mandrel may be severely damaged.

Heretofore, axial movement of the cylindrical article from the starwheel pocket onto the mandrel has been accomplished by various means. However, most prior art devices involved axial movement of a mechanical member into the starwheel pocket to displace the cylindrical article onto the mandrel. The presence of an axial moving mechanical member in the starwheel pocket further comprised trouble free operation. While the cylindrical articles, and particularly thin wall aluminum or steel wall cans, are relatively lightweight and structurally weak, the mechanical feed mechanism moving with close time and space tolerances can be easily jammed by even a lightweight article.

Examples of various axial feed mechanisms may be found, for instance, in copending Dean U.S. patent application Ser. No. 612,159 for "METHOD AND APPARATUS FOR TRIMMING CYLINDRICAL ARTICLES," now U.S. Pat. No. 4,014,228, Maytag U.S. Pat. No. 3,425,251 and Larken et al. U.S. Pat. No. 3,838,653. In these prior approaches, a ram member is axially displaced into the starwheel pocket to physically push the can onto a corresponding mandrel. After the process is accomplished, the can may be ejected from the mandrel by a compressed air blast within the can to urge it back into the starwheel pockets.

Windstrup U.S. Pat. No. 3,548,769 employs a somewhat different approach with an indexing movement. However, again a mechanical pusher displaces the can from a starwheel pocket onto a corresponding mandrel, and a mechanical strip mechanism removes the can from the mandrel.

A particularly popular infeed approach involves the provision of a cup communicating with a vacuum source on a pusher arm which moves into the starwheel pocket. The vacuum in conjunction with the cup engages the closed end of the cylindrical artivcle and holds it securely by means of the vacuum while axial movement and processing is accomplished. Examples of such prior art apparatus employing this approach are to be found in Armbruster et al. U.S. Pat. No. 3,400,620; Cvacho et al. U.S. Pat. No. 3,756,103, Paramonoff U.S. Pat. No. 3,802,364; Langewis U.S. Pat. No. 3,802,363; Paramonoff U.S. Pat. No. 3,839,933 and Langewis U.S. Pat. No. 3,864,995.

The above specified prior art, as a whole, displays a highly developed system for can trimming utilizing rotary movement of a starwheel and corresponding mandrels carried on a rotating support with both indexing and continuous movement. However, in most every instance, a complex system for axially moving a mechanical feed member into the starwheel with attendant dangers of mistiming, jamming and damage to the apparatus is to be found.

SUMMARY OF THE INVENTION

The present invention, which provides a heretofore unavailable means for axially feeding cylindrical articles from a pocket defined in a starwheel onto a mandrel completely avoids the use of mechanical members physically moving into and out of the starwheel pockets. Rather, as a primary means for moving the cylindrical article from the starwheel pocket onto the mandrel, a jet of compressed gas is activated at the preselected position for transfer of the cylindrical article and directed to impinge on the bottom of the cylindrical article thus generating sufficient force to move the can onto the mandrel. However, in case of misadventure, the air jet is quite innocuous and does not contribute to jamming or destruction of the processing apparatus. In many instances, the mandrel and starwheel are sufficiently strong to withstand the forces of a can jamming. Further, there is no relative movement between the starwheel pocket and the mandrel such as that generated by an axial moving member into the starwheel pocket.

In a particularly preferred embodiment of this invention, a vacuum source is selectively connected to the mandrel in conjunction with the air jet to further insure that the cylindrical article will be accurately and firmly seated on the mandrel.

Accordingly, an object of the present invention is to provide a new and improved device and method for axially loading cylindrical articles from a moving support pocket onto an aligned moving mandrel.

Another object of the present invention is to provide a new and improved method and device for loading cans onto mandrels while avoiding complex, interfacing mechanical devices.

Yet another object of the present invention is to provide a new and improved method and device for loading cans onto mandrels which is simple in construction and economical to produce.

Still another object of the present invention is to provide a new and improved method and device for loading cans onto mandrels which is fail-safe in operation should there be a failure of the can loading device.

These and other objects and advantages of the present invention will become apparent from the following description.

BRIEF DESCRIPTION OF THE DRAWINGS

In the Drawings:

FIG. 2 is a longitudinal partial section and partially cut away view of the apparatus of FIG. 1;

DETAILED DESCRIPTION OF THE INVENTION

Figure 1:
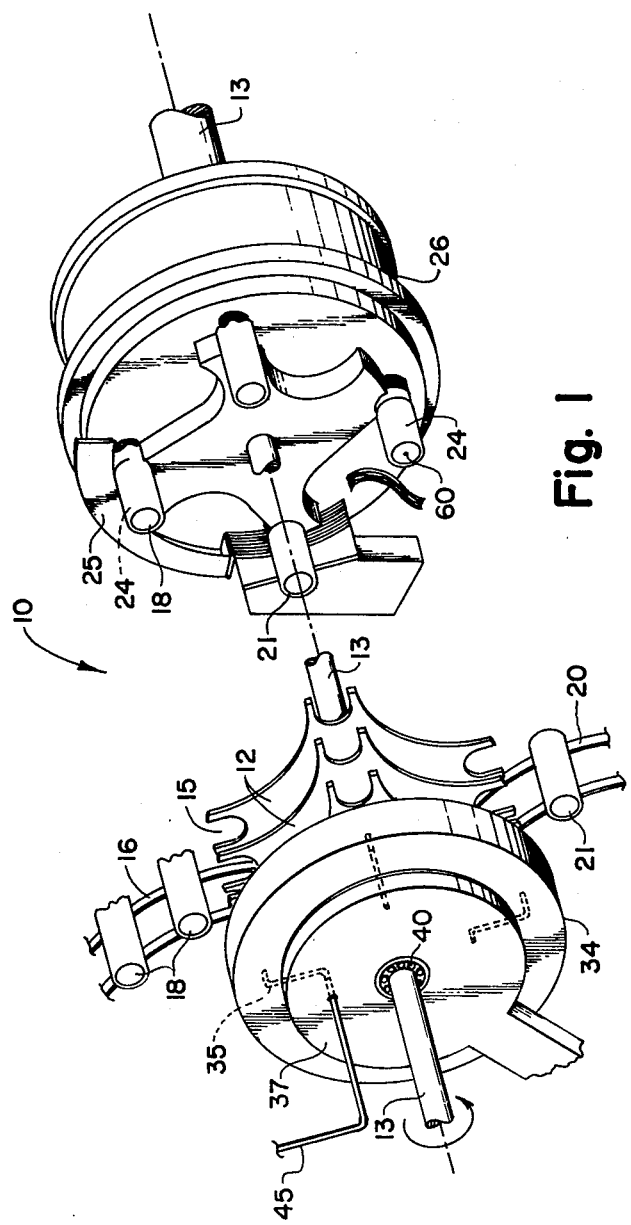
FIG. 1 is an axially exploded perspective view of a can processing apparatus embodying the device of the instant invention.
Figure 4:
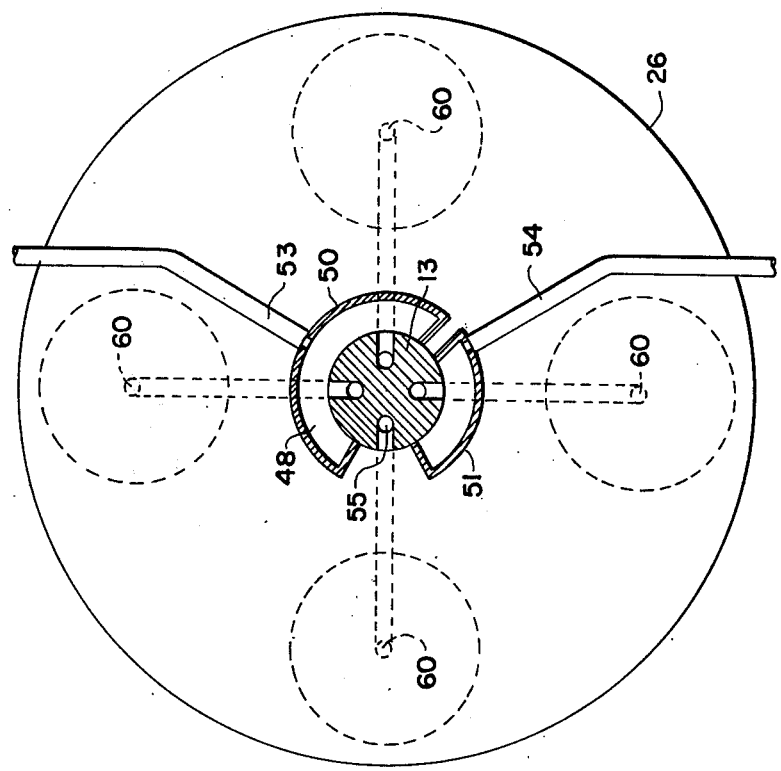
FIG. 4 is a sectional view along line IV—IV of the apparatus shown in FIGS. 1 and 2.

Turning now to the drawings wherein like components are designated by like reference numerals throughout the various figures, an apparatus for processing cylindrical articles, and particularly cans, is illustated in FIGS. 1 and 2 and generally designated 10. More specifically, processing apparatus 10 includes starwheel 12 — shown in segmented form — mounted on shaft 13. A plurality of pockets 15 are defined in starwheel 12 and interface with loading means 16 to provide for depositing of unprocessed cylindrical articles 18 in pockets 15. A number of loading means 16 are known to those skilled in the art which function with, for instance, either indexing starwheels 12 or continuously rotating starwheels 12. Reference is made to copending U.S. Patent application Ser. No. 606,683 for "METHOD AND APPARATUS FOR TRANSFERRING CANS" as a specific example of such auxiliary features.

Starwheel 12 also cooperates with unloading means 20 which removes processed cylindrical articles 21 from pocket 15 of starwheel 12. Again, unloading means are quite common and often take the form of rails which fit between the segments of starwheel 12 and guide articles 21 out of pockets 15.

Processing of articles 18 into processed articles 21 is accomplished by axially moving articles 18 from pocket 15 onto mandrels 24. For purposes of discussion and illustration, a trimming step will be illustrated and described. However, the trimming step per se is conventional and is intended to be equivalent to the other conventional processes which may be practiced upon cylindrical article 18 while supported on mandrel 24. Knife 25 serves to turn cylindrical article 18 to form processed cylindrical article 21. Reference is made to copending U.S. Patent application Ser. No. 612,159, for "METHOD AND APPARATUS FOR TRIMMING CYLINDRICAL ARTICLES," now U.S. Pat. No. 4,014,228 for the details of a particularly advantageous trimming process as illustrated.

Mandrels 24 are mounted upon mandrel support 26 which in turn is carried on shaft 13. As shown particularly well in FIG. 1, mandrels 24 and pockets 15 are axially aligned. The spacing is more readily apparent from FIG. 2 in which it is shown that mandrels 24 are adjacent to but axially spaced from starwheel 12. Pocket 15 is of sufficient length to support and carry processed article 21 as illustrated.

Mandrels 24 are preferably rotatably mounted to mandrel support 26 by means of, for instance, shaft 27 carried in bearings 28. Adjacent the end of shaft 27 spur gear 30 is provided which in turn interfaces with ring gear 32. Thus as shaft 13 rotates, gear 30 and gear 32 serve to induce a rotary motion to mandrel 24. Alternatively, mandrel 24 may be fixedly mounted to mandrel support 26 as may be required by the particular process being practiced upon cylindrical article 18.

Figure 3:
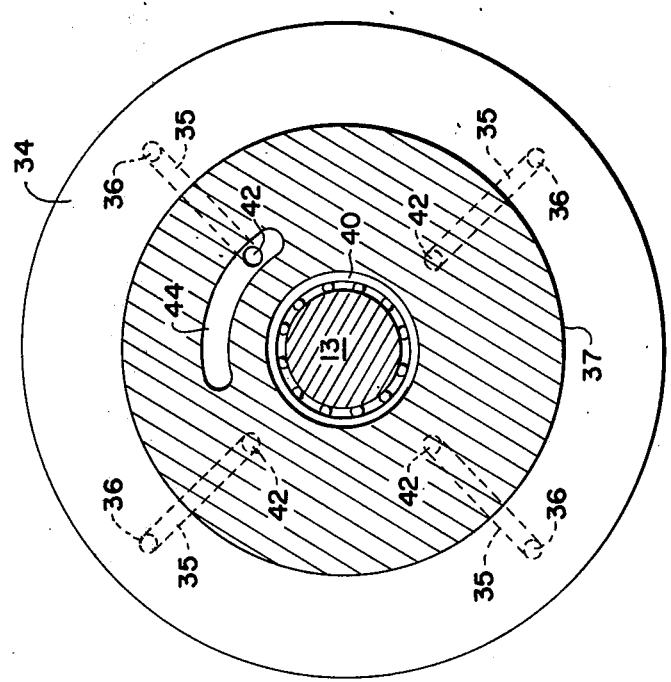
FIG. 3 is a sectional view along line III—III of the apparatus of FIGS. 1 and 2.

Also mounted to shaft 13 is conduit member 34 having a number of conduits 35 defined therethrough. Conduits 35 are arranged with outlets 36 aligned with pockets 15. First valve means 37 is provided adjacent conduit member 34 and fixedly mounted with, for instance, bearing 40 accomodating rotation of shaft 13. The details of first valve means 37 will be apparent with reference to FIG. 3. Thus, as shown, first valve means 37 is non-rotatably mounted while conduit member 34 rotates with shaft 13. Accordingly, conduit inlets 42 sequentially come into communication with arcuate port 44 defined at the interface of conduit member 34 and first valve means 37. In this manner, at specific arcs of rotation, selected conduits 35 are brought into communication with, as shown in FIGS. 1 and 2, pressurized pipe 45 which communicates with a pressure source (not shown). During this period, a compressed gas is forcefully expelled through outlet conduit 36 impinging upon adjacent cylindrical article 18 in starwheel pocket 15 and urging cylindrical article 18 onto mandrel 24. In this manner, cylindrical article 18 is positively loaded onto mandrel 24 without reliance upon complicated mechanical push rods, vacuum cups, etc., without axial movement of a mechanical component into the pockets of starwheel 12 and, without reliance upon movement of mandrel 24 towards, or relative to, pockets 15 of starwheel 12. At such time that inlet 42 of any given conduit 35 is not in communication with arcuate port 44, there is no pressure or compressed gas flow through such conduit 35.

Though it is preferable that a moving conduit member 34 be employed to maintain conduit outlet 36 in alignment with pocket 35, it is conceivable and, particularly in low speed operation, workable, that a fixed outlet be employed. In such an arrangement, a constant compressed gas flow through a fixed conduit could be maintained and would impinge upon cylindrical article 18 only as starwheel 12 moved cylindrical articles 18 into the appropriate position for transfer. This approach avoids the need for dynamic valving and timing but does not afford precise alignment of the gas flow and picket 15 as does the preferred first described arrangement.

Also, other valving means could be employed. For instance, as shown at, for instance, FIG. 2, on the opposite end of shaft 13 (as first valve means 37), second valve means 48 may take the form of shoes 50 and 51 which sealingly interface with shaft 13. As illustrated, shoe 50 communicates with vacuum line 53 connected to a vacuum source (not shown). Similarly, shoe 51 communicates with a pressure line 54 which in turn is connected to a pressure source (not shown). A number of U-passages 55 at a common axially position as shoes 50 and 51 at one opening are defined in shaft 13 and communicated in turn at the other opening with radial pipes 57 which terminate at a rotary union 58. Rotary union 58, in turn, is connected to passageway 60 defined through shaft 27 and mandrel 24.

In operation, as shaft 13 rotates, U-passages 55 sequentially come into communication with, for instance, shoe 50 thereby generating a vacuum in the exposed U-passage 55, attached radial pipe 57 and rotary union 58 and, in turn, provides a vacuum through passageway 60 to the end of mandrel 24. Such a vacuum at the end of mandrel 24 is preferably provided and timed to cooperate with the gas jet from outlet 36 of corresponding conduit 35. Thus conduit 35 produces a gas jet which urges cylindrical article 18 towards mandrel 24 and, upon location of cylindrical article 18 at mandrel 24, mandrel port 62, and the accompanying vacuum provided by the above-discussed operation of vacuum shoe 50 of second valve means 48 serves to create a vacuum internal of cylindrical article 18 to securely locate cylindrical article 18 on mandrel 24. Preferably, such vacuum is mantained while the processing step is carried out. Thereafter, the subject U-passage 55 rotates out of communication with shoe 50 and into communication with shoe 51. At that time, pressure line 54 connected to shoe 51 pressurizes subject U-passage 55, radial pipe 57 and rotary union 58 and, ultimately provides a pressurized gas at mandrel ports 62 through passageway 60. This serves to expel processed cylindrical article 21 from mandrel 24 back into axially aligned pocket 15 of starwheel 12. Of course, other conventional unloading means such as mechanical push members may be employed. As discussed above, use of pressurized air per se is not novel for purposes of unloading a processed cylindrical article 21 from mandrel 24. However, the advantages of using a pneumatic unload for cylindrical article 21 in conjunction with a gas jet load for cylindrical article 18, and thus avoiding axially moving mechanical mechanisms, are substantial.

It will be apparent to those skilled in the art that first valve means 37 and second valve means 48 are fundamentally interchangeable. For instance, to use second valve means 48 in place of first valve means 37, only a pressure shoe would be employed and U-shaped passages would extend from the fixed valve means through shaft 13 into conduit member 34. Conversely, in the event first valve meams 37 were to be used in place of second valve means 48, two arcuate ports 44 would be defined in first valve means 37, one to communicate with a vacuum source and the other to communicate with a pressure source. Other functional valve means will also be apparent to those skilled in the art.

Summarily, the loading means of the instant invention provides for synchronized, pure axial displacement of a cylindrical article out of the starwheel pocket onto an aligned mandrel for various types of processing of the cylindrical article. The mandrel may be fixed or rotating relative to its support. Preferably, the mandrel is provided with a channel which may be selectively connected to a vacuum source to aid in loading and securing of the cylindrical article on the mandrel, and at an appropriate time, connected to a pressure source to expel the trimmed or otherwise processed cylindrical article from the mandrel into the starwheel pocket.

Although only limited embodiments of the present invention have been described and illustrated, it is apparent that various changes and modifications can be readily made by those skilled in the art, and that such changes and modifications can be made without departing from the scope of the invention as defined by the following claims.

What is claimed is:

1. A device for high speed loading of cylindrical articles closed at one end onto mandrels, the device comprising;

a plurality of mandrels each having a longitudinal passageway defined therethrough and each being spaced on a common circle and carried for rotation on a mandrel support journalled for rotation around the axis of such common circle;

a starwheel mounted for rotation around the axis of such common circle, the starwheel having defined therein a plurality of pockets each axially aligned with and at least partially axially spaced from the corresponding mandrel;

a rotating member mounted concentric with the axis of the common circle and connected for rotation with the starwheel, the rotating member having a plurality of conduits, each having an inlet and an outlet, defined therein with each conduit outlet aligned with a corresponding starwheel pocket and directed toward the corresponding mandrel, and conduit inlets being positioned concentric to the axis of the common circle on an opposite surface of the rotating member;

means for synchronously rotating the starwheel, the mandrel support and the rotating member in a substantially continuous manner at a substantially constant speed;

means for loading cylindrical articles into the starwheel pocket at a first predetermined position;

means for removing cylindrical articles from the starwheel pockets at a second predetermined position;

means providing a vacuum source;

means providing a source of compressed gas;

a fixed valve block member closely interfacing with the rotating member and positioned on the conduit inlet side thereof, the valve block member having defined therein an arcuate port positioned in the rotational path of the conduit inlets and adapted to communicate with such inlets, the arcuate port being in communication with the compressed gas source means; and first valve means for selectively connecting each mandrel passageway with the vacuum source means at a first selected portion of the rotation of the mandrel support including the position substantially immediately adjacent the conduit opening, and for selectively connecting such mandrel passageway with the compressed gas means at a second selected portion of the rotation of the mandrel support following the first selected portion of such rotation but prior to rotation to position such mandrel passageway at the means for removing the articles from the starwheel at the second predetermined position;

whereby cans deposited in the constantly rotating starwheel pockets at the first predetermined position may be urged towards the constantly rotating mandrel by a gas jet from the aligned conduit outlet opening to provide loading of the cans with aid of the vacuum means but without axial movement of mechanical parts or aid of mechanical positioning means.

2. High speed loading device as set forth in claim 1 in which the first valve means comprise:
   a rotating member mounted concentric with the axis of the common circle and connected for rotation with the starwheel, the rotating member having the plurality of conduits having inlets and outlets defined therein with conduit outlets connected with the corresponding mandrel passageway at one end and conduit inlets being on an opposite surface of the rotating member, and
   a fixed valve block member closely interfacing with the rotating member, the valve block having defined therein a port positioned in the path of travel of the conduit inlets, and adapted to intermittently communicate with such inlets, and the arcuate port being connected to the vacuum source means.

3. A high speed loading device as set forth in claim 1 in which the first valve means comprise a fixed, hollow shoe closely fitting a shaft concentric with the mandrel support and starwheel and rotatable therewith,
   U-shaped passages defined in the shaft with one end of the passages being aligned axially along the shaft for communication with the interior of the shoe and the other end of which U-shaped passages each being in communication with a radial pipe which in turn is connected to a mandrel passageway, the shoe interior being connected to the vacuum source means.

4. A device for high speed loading of cylindrical articles closed at one end onto mandrels, the device comprising;
   a plurality of mandrels each having a longitudinal passageway defined therethrough and each being spaced on a common circle and carried for rotation on a mandrel support journalled for rotation around the axis of such common circle;
   a starwheel mounted for rotation around the axis of such common circle, the starwheel having defined therein a plurality of pockets each axially aligned with and at least partially axially spaced from the corresponding mandrel;
   a rotation member mounted concentric with the axis of the common circle and connected for rotation with the starwheel, the rotating member having a plurality of conduits, each having an inlet and an outlet, defined therein with each conduit outlet aligned with a corresponding starwheel pocket and directed towards the correspondng mandrel, and conduit inlets being positioned concentric to the axis of the common circle on an opposite surface of the rotating member;
   means for synchronously rotating the starwheel, the mandrel support and the rotating member in a substantially continuous manner at a substantially constant speed;
   means for loading cylindrical articles into the starwheel pocket at a first predetermined position;
   means for removing cylindrical articles from the starwheel pockets at a second predetermined position;
   means providing a vacuum source;
   means providing a source of compressed gas;
   a fixed, hollow shoe closely fitting a shaft concentric with the mandrel support and starwheel, and rotatable therewith;
   U-shaped passages defined in the shaft with one end of the passages being aligned axially along the shaft for communication with the shoe, and the other end of which U-shaped passages are connected to the plurality of conduits aligned with the pockets defined in the starwheel, the shoe in turn being connected to the means providing a source of compressed air;
   first valve means for selectively connecting each mandrel passageway with the vacuum source means at a first selected portion of the rotation of the mandrel support including the position substantially immediately adjacent the conduit opening, and for selectively connecting such mandrel passageway with the compressed gas means at a second selected portion of the rotation of the mandrel support following the first selected portion of such rotation but prior to rotation to position such mandrel passageway at the second predetermined position;
   whereby cans deposited in the constantly rotating starwheel pockets at the first predetermined position may be urged towards the constantly rotating mandrel by a gas jet from the aligned conduit outlet opening to provide loading of the cans with aid of the vacuum means but without axial movement of mechanical parts or aid of mechanical positioning means.

5. High speed loading device as set forth in claim 4 in which the first valve means comprise:
   a rotating member mounted concentric with the axis of the common circle and connected for rotation with the starwheel, the rotating member having the plurality of conduits having inlets and outlets defined therein with condhuit outlets connected with the corresponding mandrel passageway one end and conduit inlets being on an opposite surface of the rotating member, and
   a fixed valve block member closely interfacing with the rotating member, the valve block having defined therein a port positioned in the path of travel of the conduit inlets, and adapted to intermittantly communicate with such inlets, and the arcuate port being connected to the vacuum source means.

6. A high speed loading device as set forth in claim 4 in which the first valve means comprise a fixed, hollow shoe closely fitting a shaft concentric with the mandrel support and starwheel and rotatable therewith,
   U-shaped passages defined in the shaft with one end of the passages being aligned axially along the shaft for communication with the interior of the shoe and the other end of which U-shaped passages each being in communication with a radial pipe which in turn is connected to a mandrel passageway, the shoe interior being connected to the vacuum source means.

* * * * *